J. W. BROKAW AND M. L. DODGE.
METHOD OF FORMING STAVES AND MACHINE THEREFOR.
APPLICATION FILED SEPT. 28, 1916.

1,322,528.

Patented Nov. 25, 1919.
6 SHEETS—SHEET 1.

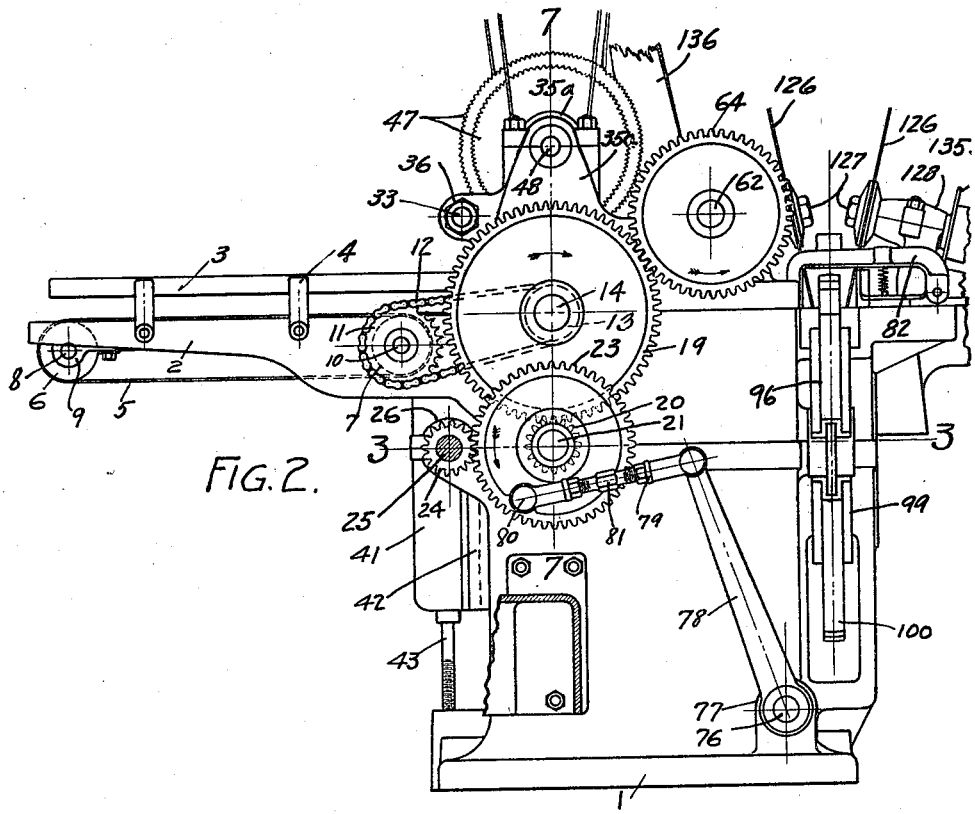
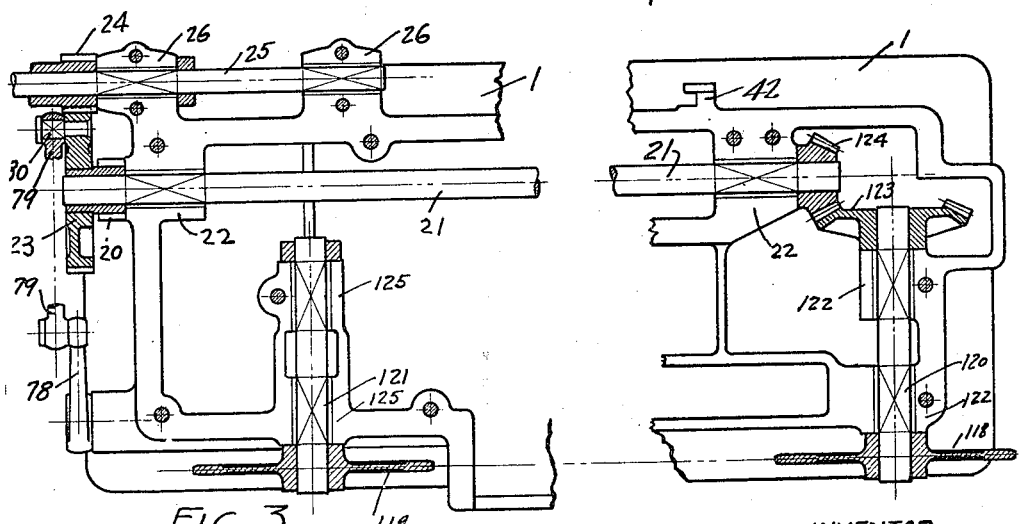

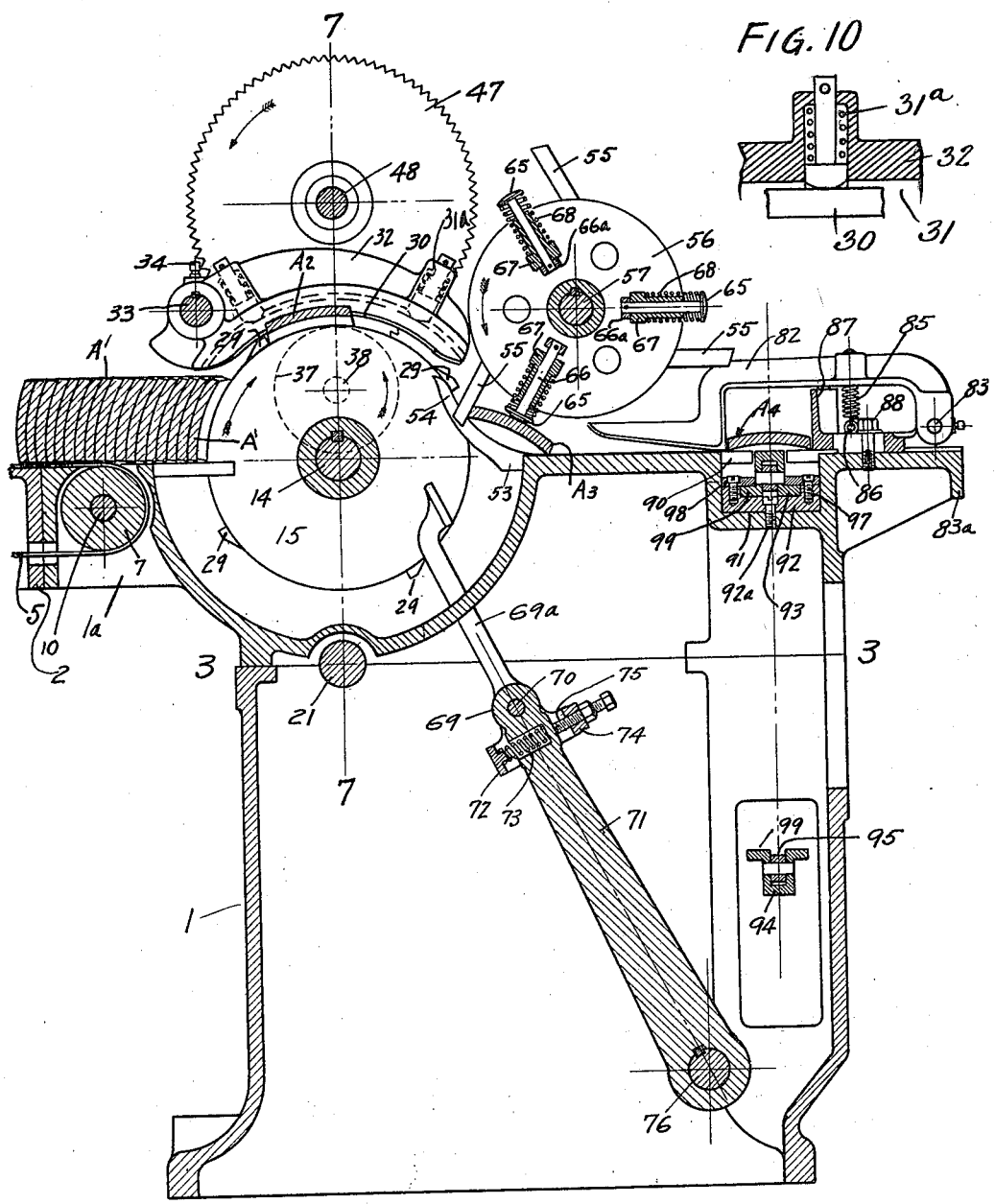

J. W. BROKAW AND M. L. DODGE.
METHOD OF FORMING STAVES AND MACHINE THEREFOR.
APPLICATION FILED SEPT. 28, 1916.

1,322,528.

Patented Nov. 25, 1919.
6 SHEETS—SHEET 4.

UNITED STATES PATENT OFFICE.

JAMES W. BROKAW, OF TACOMA, AND MERTON L. DODGE, OF SEATTLE, WASHINGTON, ASSIGNORS OF EIGHTY PER CENT. TO SAID BROKAW AND TWENTY PER CENT. TO SAID DODGE.

METHOD OF FORMING STAVES AND MACHINE THEREFOR.

1,322,528.  Specification of Letters Patent.  Patented Nov. 25, 1919.

Application filed September 28, 1916. Serial No. 122,644.

*To all whom it may concern:*

Be it known that we, JAMES W. BROKAW, a citizen of the United States, residing at Tacoma, in the county of Pierce and State of Washington, and MERTON L. DODGE, a citizen of the United States, residing at Seattle, in the county of King and State of Washington, have invented new and useful Improvements in Methods of Forming Staves and Machines Therefor, of which the following is a specification.

This invention relates to the method of forming staves and machines therefor and consists in certain improvements in the construction thereof as will be hereinafter fully described and pointed out in the claims.

The object of the invention is to provide a machine for forming staves especially for such articles as tubs and pails. In carrying out the invention the staves are formed and completed so that they can be assembled in the tub or pail and will require no subsequent finishing.

In a general way the process used is as follows:—The staves are so shaped as to give the average curve of the tub or pail in a sticker. Ordinarily the curve assumed would be the true curve at the center of the pail. The blanks are then carried through the machine and the croze formed of proper diameter and at a proper angle and the ends sawed at the proper angle with relation to the croze and finished ends of the staves. The staves are then sawed giving the edges a radial direction and the right difference in width to make the difference in the diameter at the top and bottom of the pail. In forming tubs or pails with staves of this kind, the staves are practically finished before assembling so that the pail or tub needs no further finishing after they are assembled. In this way the labor involved in forming such articles is very greatly reduced and the waste of material is also somewhat reduced.

The invention is illustrated in the accompanying drawings as follows:—

Figure 1:
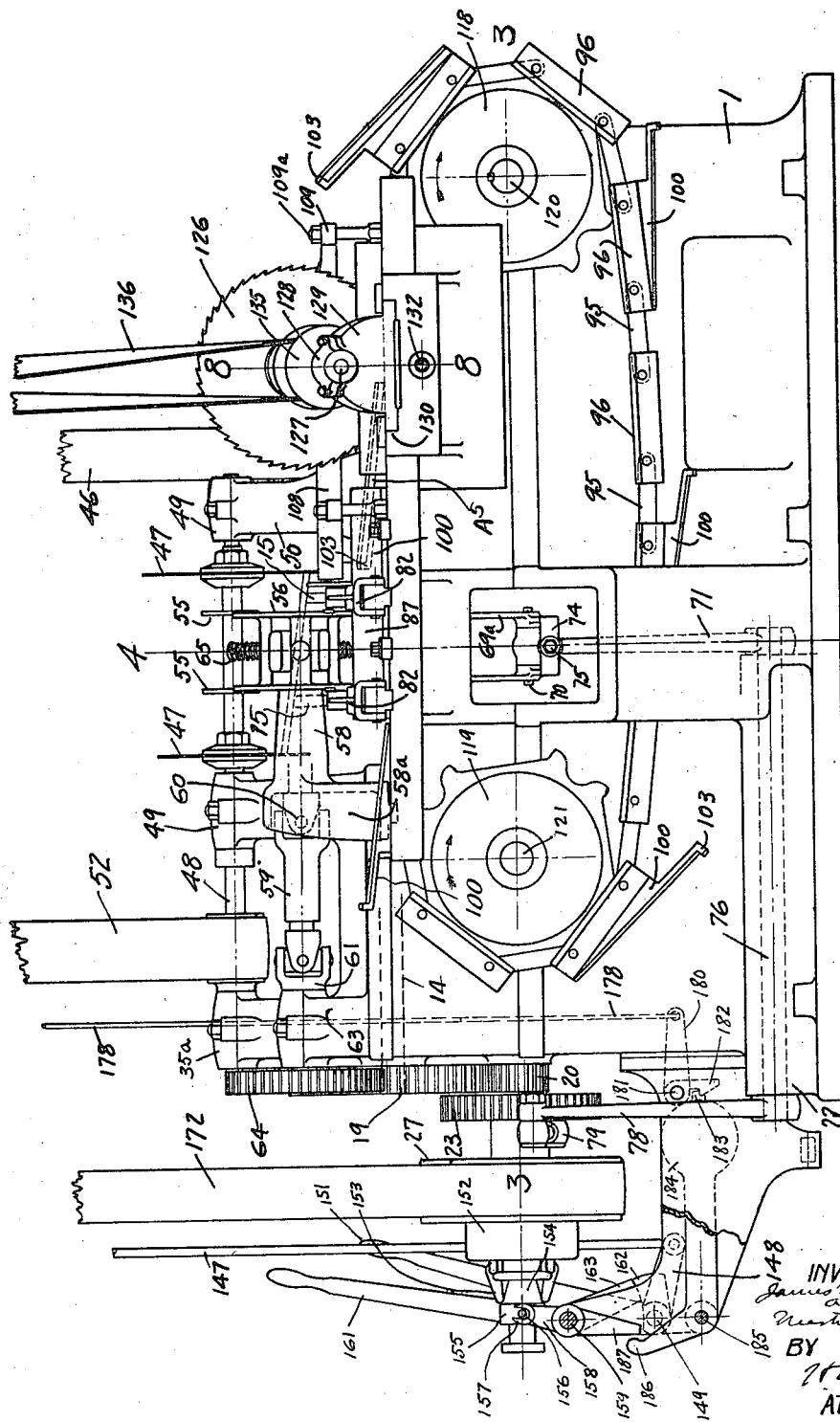

Figure 1 shows a front elevation of the machine.

Fig. 2 an end view of the machine.

Fig. 3 a section on the lines 3—3 in Figs. 1, 2, and 4.

Fig. 4 a section on the line 4—4 in Fig. 1.

Figure 5:
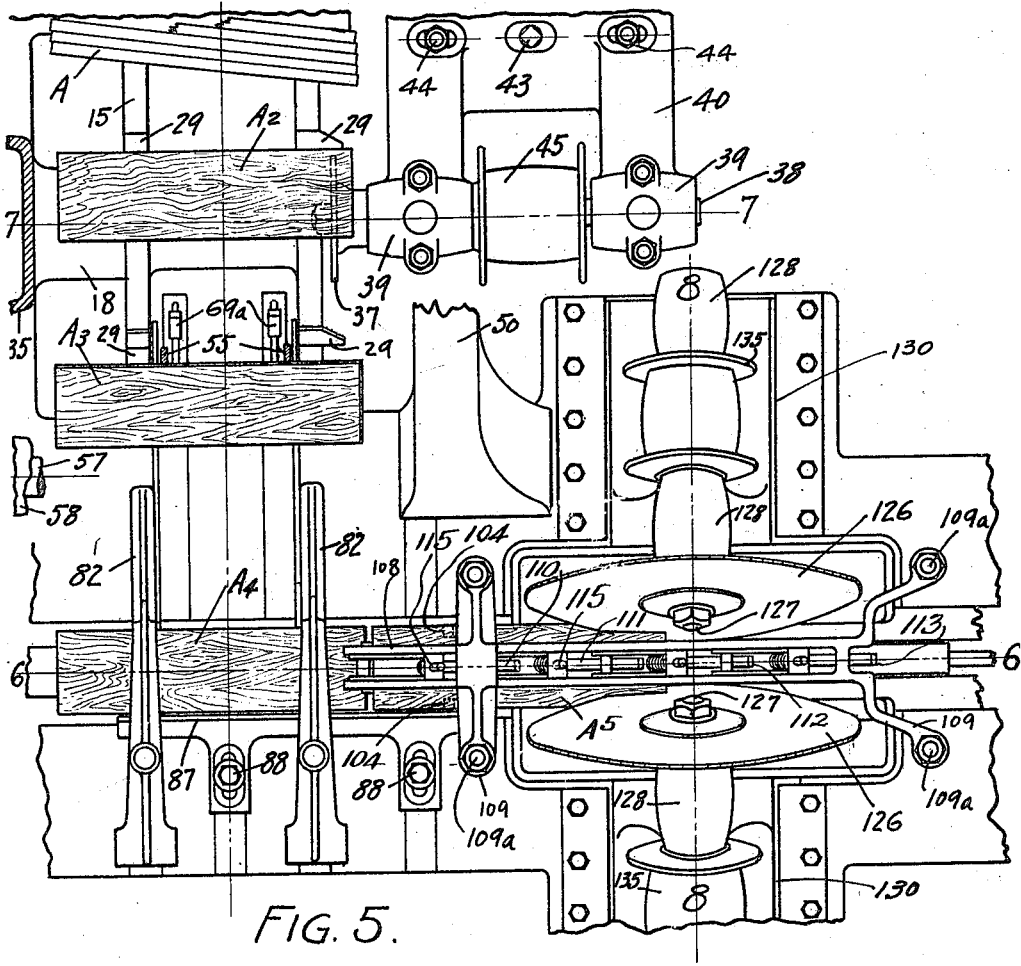

Fig. 5 a plan view of a portion of the machine.

Figure 6:
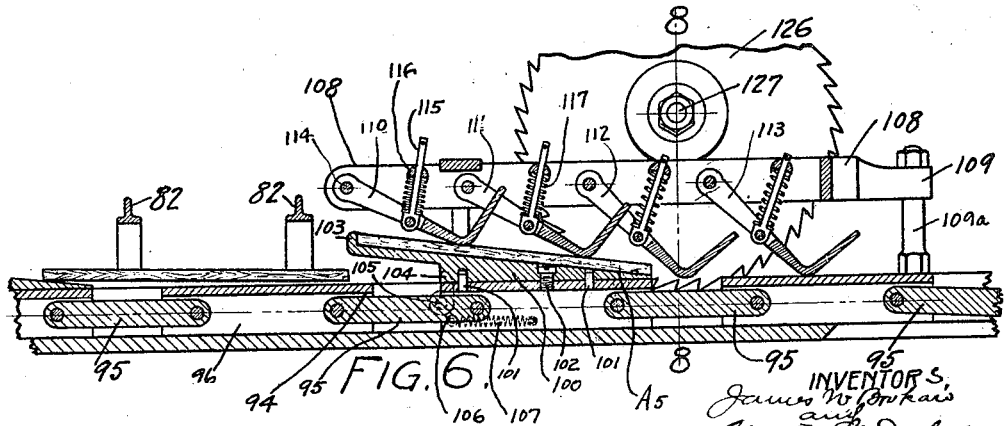
Figure 8:
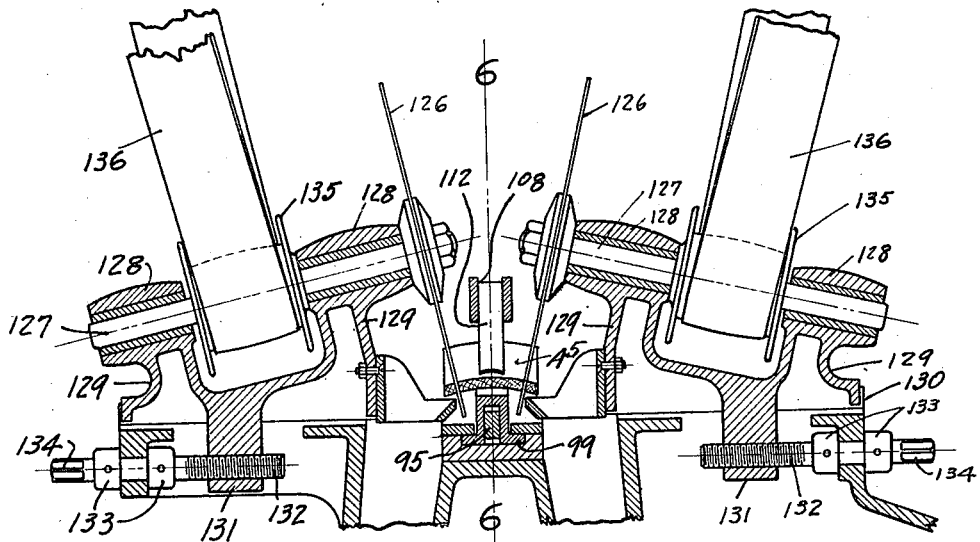

Fig. 6 a section on the lines 6—6 in Figs. 5 and 8.

Figure 7:
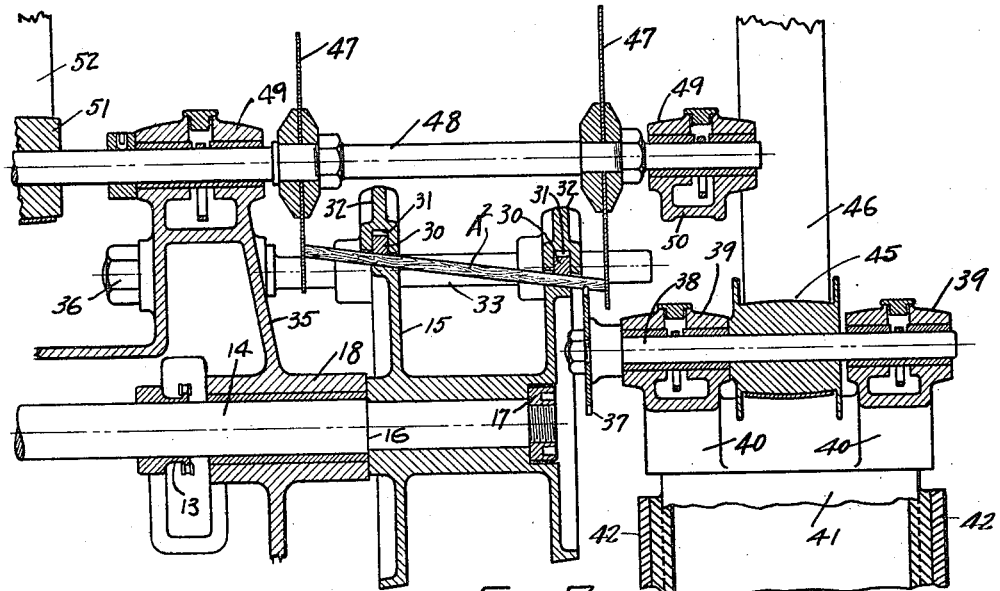

Fig. 7 a section on the lines 7—7 in Figs. 2, 4 and 5.

Fig. 8 a section on the lines 8—8 in Figs. 1, 5 and 6.

Figure 9:
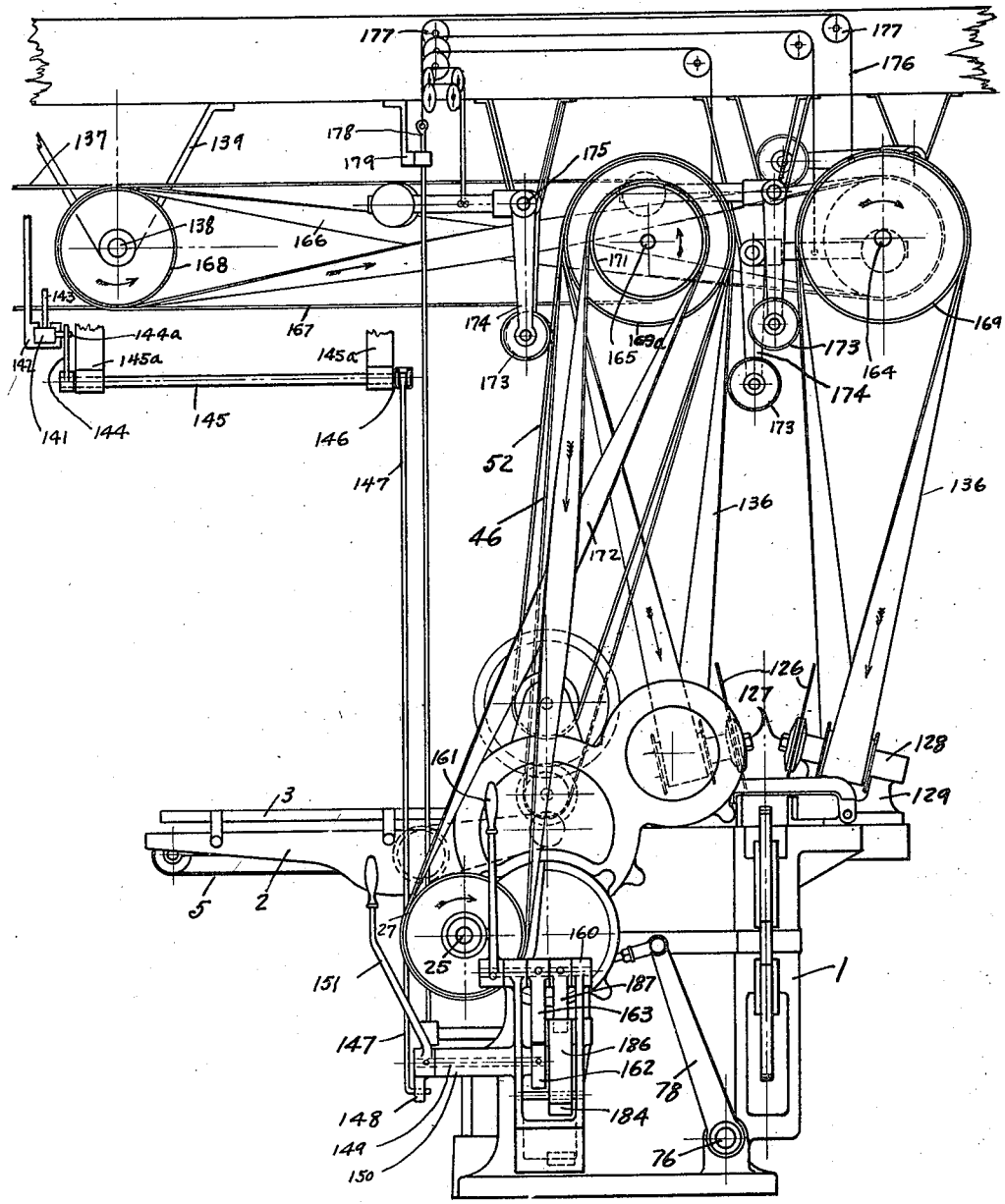

Fig. 9 an end view of the machine showing the driving mechanism and safety stops.

Fig. 10 is a detail view of the stave pressing shoe and springs therefor.

1 marks the frame of the machine. A feed table 2 extends laterally from the machine, the frame being provided with an extension 1ª to which the table is attached. Side bars 3 are secured above the table by means of posts 4. The guide bars are designed to engage the ends of the blanks as they are fed to the machine. A feed belt 5 has one span just above the level of the table 2 so as to engage and carry forward blanks deposited on the table. The belt 5 is carried by the pulleys 6 and 7. The pulley 6 is mounted on a shaft 8 carried by the bearing 9 secured to the underside of the table. The pulley 7 is carried by a shaft 10 journaled in bearings (not shown) in the extension 1ª. A sprocket wheel 11 is secured to the shaft 10. A sprocket chain 12 operates on the sprocket 11 and communicates movement to the sprocket 11 from a sprocket 13 (see Fig. 7). The sprocket 13 is mounted on a shaft 14 forming one of the driving elements of the machine.

The blanks are placed on the table edgewise as clearly shown in Fig. 4 and are carried forward against a carrier 15. The carrier 15 is mounted on the shaft 14 (see Fig. 7), the shaft having shoulders 16 against which the carrier is forced by a nut 17 arranged at the end of the shaft 14.

The shaft 14 is mounted in bearings 18 in the frame. A gear 19 is fixed on the end of the shaft (see Figs. 1 and 2). The gear 19 meshes a pinion 20 and the pinion 20 is fixed on a shaft 21. The shaft 21 is mounted in bearings 22 (see Fig. 3). A gear 23 is fixed on the shaft 21 outside the gear 20. The gear 23 meshes a gear 24. The gear 24 is mounted on a shaft 25 and the shaft 25 is journaled in bearings 26 arranged on the frame (see Fig. 3). A drive pulley 27 is mounted on the shaft 25 and the feeding parts of the machine are driven from this shaft.

The carrier 15 is given rotary motion. It is provided with the carrier dogs 29 which are arranged peripherally around the carrier and which as they come into engagement with the edge of a blank as A (see Fig. 4) carry this blank forward with it separating it from the pile. As the blank is advanced on the carrier it moves under a spring-pressed shoe 30 (see Figs. 4 and 7), the shoe being placed in a socket 31 in backings 32 and the springs (not shown) actuating said shoe being arranged in spring pockets 31$^a$. The backings 32 are mounted on a shaft 33 and are locked in adjustment by the set screws 34. The shaft 33 extends through a post 35 extending upwardly from the frame and is clamped in position by a nut 36 on the end of the shaft.

It will be noted that the carrier 15 is tapered and this taper is exactly the taper or flare of the tub or pail and the blank is moved in a circular path, the radius of the curve being the radius of the finished pail.

A cutter 37 is in the path of the blank as it is carried forward by the carrier 15 and cuts the croze in the stave. This croze, it will be noted, will have the proper curve and relation for the finished pail by reason of the direction of movement given to the blank. The cutter 37 is carried by a shaft 38 and the shaft 38 is mounted in bearings 39 (see Fig. 7). The bearings are carried by the posts 40 extending from a movable bracket 41. This bracket 41 is mounted in guides 42 (see Fig. 2) at the side of the frame. It can be adjusted by the screw 43 so as to vary the position of the cutter 37 for different sizes of carriers 15 and the movable bracket 40 is locked by the screws 44 (see Fig. 5). A drive pulley 45 is arranged on the shaft 38 between the bearings 39 and a belt 46 drives the shaft and cutter 37.

Saws 47 are mounted on the shaft 48. They are in position to engage the blank as A$^5$ as the carrier reaches the upper part of its movement. They are so distanced as to give the blank exactly the right length and are in parallel relation and operate upon the blank at the proper angle so as to make the top and bottom of the finished staves level when assembled in the pail or tub. The shaft 48 is mounted in bearings 49, one of these bearings being carried by the post 50, another by the post 35, and the third bearing by a post 35$^a$ (see Fig. 1). A pulley 51 is fixed on the shaft 48 and a belt 52 is arranged to drive the pulley and shaft and cut-off saws.

After this operation the blank is carried forward to mechanism for trimming and shaping the edges. As the carrier 15 moves forward it is carried onto the guide bars 53 mounted in the frame, the bars having fingers 54 extending up into the carrier 15 (see Fig. 4). An extractor having arms 55 mounted on a wheel 56 is so timed as to bring an arm 55 back of the stave or blank as it is expelled from under the spring-actuated shoe 30. The extractor wheel 56 is carried by a shaft 57. The shaft 57 is mounted in a bearing 58, the bearing 58 being carried by a post 58$^a$ movable laterally on the frame to accommodate different sizes of carriers (the adjusting mechanism not being shown). The shaft 57 is connected with a link or tumbler shaft 59 by a knuckle joint 60 and the shaft 59 is connected by a knuckle joint 61 with a shaft 62 (see Fig. 2). The shaft 62 is mounted in bearings 63 arranged in the post on the frame. A gear 64 is fixed on the end of the shaft 62 and meshes a gear 19 so that the extractor wheel 56 is properly timed with relation to the carrier 15. It will be noted that the carrier has four dogs 29, the extractor three arms 55 and that the extractor by reason of the variation in size in the gears 19 and 64 is arranged to move more rapidly than the carrier 15 so that when the blank is engaged by the arms 55 it is moved forward out of engagement with the dogs 29 as shown by the blank A$^3$ in Fig. 4. The blank is held down by a spring-pressed button 65, these buttons being arranged just in advance of the arms 55. The buttons are carried by the pins 66 which extend through guides 67 on the extractor wheel 56 and springs 68 are arranged between the guides and buttons forcing them outwardly, the ends of the pins having collars 66$^a$ holding the pins in the guides.

After the blank has been advanced some distance by the arms 55 it is engaged by a transfer lever 69. The transfer lever has a yielding arm 69$^a$ at its upper end or at the point of engagement with the blank, the yielding arms being mounted on the pins 70 on the rigid arm 71. A strap 72 extends at one side of the rigid arm. A spring 73 tends to push the yielding arm 69$^a$ forward. The strap 74 at the opposite side of the rigid arm 71 is provided with a set screw 75 which limits the forward movement of the yielding arm 69$^a$ under the influence of the spring 73. The arm 69 is mounted on the rock shaft 76 (see Fig. 4). The rock shaft 76 is carried in bearings 77 (see Fig. 2). The rock arm 78 is fixed on the end of the shaft 76 and is connected by means of a pitman 79 with a crank 80 on the gear 23. In this manner the arm 69$^a$ is given a rocking movement timed in relation to the other feeding elements of the machine. In order to vary the throw of the arm 69 the pitman 79 has an adjustable link 81. The transfer lever 69 having engaged the blank on the guide bars 53, the blank is forced forward under the hook arms 82 (see Fig. 4) and into position against a stop 87, the adjusting link 81 permitting a nice adjustment of the transfer lever 69 so as to bring the blank to the position shown by the blank A⁴ against the back stop 87. The hook arms 82 are mounted on pins 83 and these are carried by the brackets 83ᵃ on the frame. The springs 85 tend to hold the hook arms downwardly, the springs extending from the hook arms from the eye bolts 86 secured to the frame. The back stop or stop plate 87 is secured by the screws 88 which extend through slots in the back stop into the frame. The back stop may be adjusted for different widths of blanks by loosening the screws 88 and moving it outwardly or inwardly, the slots being provided to permit this adjustment.

The blank as A⁴ is carried onto the guide bars 90. A groove 91 is arranged in the frame below the guide bars 90 and extends the full length of the frame. A chain bearing-plate 92 is arranged at the bottom of this pocket being secured at intervals by the screws 92ᵃ. It has a groove 93 along which the chain travels. The chain carrier 94 is made up of the links 95 and 96. The links 96 have projections 99 which extend under plates 98 at the top of the guide plate 92, the plates 98 being secured by screws 97. Every other link 96 is provided with a bunk 100, this bunk having a slant or taper relatively to the path of travel of the chain corresponding to the taper of the pail or tub. The bunk is fixed in position on the link by the pins 101 and secured in position by the screw 102. The rear end of each bunk is provided with a hook 103 which forms a driver for the blank carried by the bunk, one of these blanks as A⁵ being clearly shown in Fig. 6. In order to assure the proper positioning of the blank on the bunk and against the hook or stop 103 yielding dogs 104 are provided each side of the chain in the path of the ends of the blank. These dogs are mounted on pins 105 and have the arms 106 to which the springs 107 are attached. The blank coming into contact with the dogs is forced back against the hook 103 and with a further movement of the chain the dogs yield permitting the blank to pass forward.

A frame formed of a pair of bars 108 is arranged above the chain. This has the arms 109 and is secured to the frame by means of the posts 109ᵃ. A series of presser feet 110, 111, 112 and 113 are mounted between the bars 108 by means of pins 114. Each foot has a spring pin 115 which is pivotally secured to the foot and extends through a bar 116 extending between the frame bars 108. Springs 117 are arranged between the presser feet and the bars 116 and tend to force the presser feet downwardly. Before the yielding dogs 104 are engaged by the blanks, the first foot 110 has engaged the blank and holds it yieldingly on the bunk. As the blank is advanced the feet are brought into operation successively and are close enough together so that at least two of these are in engagement with the blank as the blank is advanced past the edge saws.

The chain is mounted on the sprocket wheels 118 and 119. The sprocket wheel 118 is carried by the shaft 120 and the sprocket wheel 119 by the shaft 121. The shaft 120 is mounted in bearings 122 in the frame (see Fig. 3). A beveled gear 123 is fixed on the shaft 120 and meshes a gear 124 fixed on the shaft 21. Thus the sprocket chain is driven from the same shaft as the crank 80 which actuates the transfer lever 69. Consequently the movement of the transfer lever is accurately timed with relation to the chain and the blanks are moved onto the chain and under the hook arms just behind a bunk so that as the chain advances the forward end of the succeeding bunk is carried under the blank, such a condition being shown by the blank A⁴ in Fig. 4. The shaft 121 is journaled in bearings 125 carried by the frame (see Fig. 3). The frame is separated on the plane of these bearings to simplify the construction as clearly shown in Fig. 3.

The edge saws 126 are carried by the spindles 127 and the spindles 127 by the bearings 128. The bearings 128 are mounted in the movable posts 129 and the posts 129 are mounted in the guides 130 on the frame (see Fig. 5). Projections 131 extend downwardly from the post 129 through the frame and screws 132 extend through these projections. The screws 132 have the collars 133 locking them with the frame and are provided with the squared ends 134 by means of which the saws 126 may be moved inwardly or outwardly to adjust them to various widths of staves. Drive pulleys 135 are mounted on the spindles 127 between the bearings 128 and belts 136 operate on these pulleys to drive the saws. The saws are set at an angle so that the planes of the saws intersect at what would be the center of a pail or tub formed by the stave in position to be sawed. The blanks are fed between the saws with the proper angle to this axis to provide for the flare or taper of the pail or tub so that the edges are sawed not only in radial planes but the slant of the blank brings the top of the stave blank against the saws above their narrower point and consequently give to the stave exactly the right increase in width or taper. The staves are made of such a size that when assembled they will exactly fill the circle for which they are designed. After the staves have passed the edge saws they are carried by the chain to the end of the machine where they are dropped, practically finished.

It is necessary, or at least very desirable for the saws to be in motion only when feeding of the blanks through the machine takes place. We have provided a driving mechanism for the various saws which requires that the saws be set in operation before the feeding mechanism can be operated and have further provided mechanism that will stop the feeding mechanism upon the breaking of any belt driving the saws or cutters. The driving scheme is shown in Fig. 9. A drive belt 137 communicates movement to a pulley (not shown) mounted on a shaft 138, this shaft being carried by a hanger 139. The belt is designed to operate upon tight and loose pulleys in the usual manner and the belt shifting rod 141 is mounted in a hanger 142. The shift pins 143 engage the sides of the belt 137 in the usual manner. A rock arm 144 engages a pin 144$^a$ on the shift rod 141. The rock arm 144 is mounted on a rock shaft 145 and this is carried by the hangers 145$^a$. A rock arm 146 is fixed on the shaft 145 at the opposite end from the rock arm 144 and a link 147 connects the rock arm 146 with the rock arm 148. The rock arm 148 is mounted on a shaft 149. The shaft 149 is carried in a bearing 150 extending from the frame. A hand lever 151 is provided secured to the lever 148 by means of which the belt shifter may be operated to throw the driving mechanism into and out of action. A cone clutch 152 is provided on the drive pulley 27 (see Fig. 1). It is actuated by the usual levers 153 operating on a cone 154. The cone has a collar or extension 155 with a pin 156 which engages forks 157 of a lever 158. The lever 158 is mounted on a shaft 159 and the shaft 159 is carried by the bearings 160 (see Fig. 9). A hand lever 161 is secured to the shaft 159 by means of which the cone clutch may be thrown in or out so as to start the feeding mechanism of the machine or throw it out.

In order to assure the starting of the saws before the feeding mechanism is thrown in, we have provided the following interlocking mechanism: An arm 162 is mounted on the shaft 149 in the path of an arm 163 mounted on the shaft 159. As shown in Fig. 1, the parts are in position for operation. It will be readily seen that in order to throw the lever 151 and consequently the arm 162 it will first be necessary to throw the arm 163 forward thus it is necessary to move the forked end 156 so as to throw out the cone clutch prior to the stopping of the saws by the movement of the lever 151. In reversing this operation in starting the machine, it is necessary to throw the lever 151 and carry the arm 162 downwardly so that the arm 163 may clear it before it is possible to set the cone clutch.

It is desirable to have mechanism that will automatically stop the feeding mechanism when any saw or cutter stops. Countershafts 164 and 165 are provided for driving the different parts of the machine. These are mounted in suitable hangers. A belt 166 drives the countershaft 164 and a belt 167 the countershaft 165. These belts are driven from the main drive shaft 138, pulleys 168 being provided on the shaft 138 for this purpose. The belts 136 are driven from pulleys 169 and 169$^A$ on the countershafts 164 and 165 respectively. A belt 172 is driven from a pulley 171 on the countershaft 165 and operates the drive pulley 27. Rider pulleys 173 are provided for each of the belts driving a saw or cutter and each of these rider pulleys are carried by an arm 174 pivotally mounted on a pin 175 with a suitable hanger. Each of these rider pulleys are so weighted that if a belt breaks they move under the influence of the weight. Cables 177 move from the arms 174 over suitable pulleys 176 to a rod 178, the rod being guided by a hanger 179. The rod 178 is connected with a latch lever 180 (see Fig. 1) and this is carried by a pin 181. The latch lever has a hook 182 which engages a finger 183 on a weighted lever 184. The weighted lever 184 is carried by a pin 185 on the frame and has an extension 186 which is in the path of an arm 187 carried by the shaft 159.

When any belt driving a saw, therefore, breaks the rider pulley on that belt and its weighted arm are released and operating through its connecting cable operates the rod 178 releasing the weighted lever 184 and this weighted lever moves the arm 187 thus swinging the shaft 159 and the lever 156 to release the cone clutch. In this way the feeding operation of the entire machine is stopped immediately so that no injury can result.

What is claimed as new is:—

1. In a stave machine, the combination of a cutter operating on a stave lengthwise of the stave; a flexible carrier having a continuous motion; a series of bunks on the carrier having continuous motion and a movement past the saws parallel to the axis of the article to be formed, the series of bunks on the carrier supporting the blank at an angle to the axis of the article to be formed; and an automatic means for feeding the blanks edgewise to the carrier.

2. In a stave machine, the combination of a cutter operating on a stave lengthwise of the stave; a flexible carrier having a continuous motion; a series of bunks on the carrier holding the blanks thereon to an inclination to the path of the carrier with the front end the lower, the carrier giving the bunks a movement past the cutter in the direction of the axis of the article to be formed; and an automatic means for feeding the blanks edgewise to the carrier.

3. In a stave machine, the combination of an edge saw having a direction in relation to the stave extending to the axis of the finished article for which the stave is designed; a feeding device comprising a flexible carrier; a series of bunks on the carrier holding the blanks at an angle to the path of the carrier with the front end as it approaches the saw lower than the rear end; means on the carrier for engaging the blank and driving it forward; and a yielding device in the path of the blank and exerting endwise pressure on the end of the blank as it is fed forward to force it against said means.

4. In a stave machine, the combination of an edge saw having a direction in relation to the stave extending to the axis of the finished article for which the stave is designed; a feeding device comprising a flexible carrier; a series of bunks on the carrier holding the blanks at an angle to the path of the carrier as it approaches the saw with the front end of the blank lower than the rear end thereof; means on the carrier for engaging the blank and driving it forward; a yielding device in the path of the blank exerting endwise pressure on the blank as it is fed forward to force it against said means; and means for automatically delivering the blank edgewise to the carrier as it is advanced.

5. In a stave machine, the combination of a pair of saws arranged at an angle to each other and distanced to form a stave of a width of which the finished article is a multiple; a flexible carrier having continuous motion for carrying the blank past said saws; and means for automatically delivering the blanks edgewise to the carrier as it is advanced.

6. In a stave machine, the combination of a rotary carrier giving to the stave a path of movement corresponding to the curve of the finished article; cutting devices operating on the stave as it is moved by said carrier and across the grain of the stave; an edge saw; a feeding device for carrying the blank past the edge saw; transfer mechanism for automatically transferring the stave from the rotary carrier to the feeding device; comprising a rotary extractor; and a reciprocating transfer lever.

7. In a stave machine, the combination of a rotary carrier giving to the stave a path of movement corresponding to the curve of the finished article; cutting devices operating on the stave as it is moved by said carrier and across the grain of the stave; an edge saw; a feeding device for carrying the blank past the edge saw; transfer mechanism for automatically transferring the stave from the rotary carrier to the feeding device, comprising a transfer lever having oscillatory movement; a yielding finger adapted to engage the blank and move it into position on the feeding device; and a stop limiting the movement of the blank under the influence of yielding finger.

8. In a stave machine, the combination of a rotary carrier giving to the stave a path of movement corresponding to the curve of the finished article; cutting devices operating on the stave as it is moved by said carrier and across the grain of the stave; an edge saw; a feeding device for carrying the blank past the edge saw; transfer mechanism for automatically transferring the stave from the rotary carrier to the feeding device comprising a stop adjacent to the feeding device; and a transfer lever adapted to move the blank into position against said stop and onto the feeding device.

9. In a stave machine, the combination of a rotary carrier giving to the stave a path of movement corresponding to the curve of the finished article; cutting devices operating on the stave as it is moved by said carrier and across the grain of the stave; an edge saw; a feeding device for carrying the blank past the edge saw; transfer mechanism for automatically transferring the stave from the rotary carrier to the feeding device comprising a hook arm arranged over the feeding device; and means for transferring the blank from the rotary carrier under the hook arm and onto the feeding device.

10. In a stave machine, the combination of a rotary carrier giving to the stave a path of movement corresponding to the curve of the finished article; cutting devices operating on the stave as it is moved by said carrier and across the grain of the stave; an edge saw; a feeding device for carrying the blank past the edge saw; transfer mechanism for automatically transferring the stave from the rotary carrier to the feeding device comprising a stop adjacent to the feeding device; a yielding hook arm extending over the feeding device; and devices for moving the blank from the rotary carrier under the hooked arm and over the feeding device and against the stop.

11. In a stave machine, the combination of a rotary carrier adapted to carry a blank having the curve of the finished article; a cutter adapted to engage the blank and operate across the grain thereof as it is moved by the carrier; an edge saw; a feeding device moving the blank past the edge saw; transfer mechanism from the rotary carrier to the feeding device comprising a rotary extractor adapted to engage the blank on the rotary carrier and to move the same therefrom; a transfer lever adapted to engage a blank as it is positioned by the extractor; a stop adjacent to the feeding device to which the blank is carried by the transfer lever; and means for preventing a return movement of the blank after it is placed by the transfer lever.

12. In a stave machine, the combination of a rotary carrier adapted to carry a blank having the curve of the finished article; a cutter adapted to engage the blank and operate across the grain thereof as it is moved by the carrier; an edge saw; a feeding device moving the blank past the edge saw; transfer mechanism comprising a rotary extractor, said extractor having a greater speed than the rotary carrier; and a transfer lever for taking the blank from the extractor and having a greater speed than the rotary extractor; the transfer lever being adapted to move the blank into position on the feeding device.

13. In a stave machine, the combination of mechanism for cutting a blank across the grain to form the croze in the blank; an edge saw forming the edging of the stave beveled toward the axis of the finished article; and feeding and transfer devices feeding the blank past said mechanism and automatically from said mechanism to and past the edging saw with a one-way movement of the blank past the saw.

14. The method of forming staves for tapered receptacles which consists in forming blanks, each having a cylindrical surface having a radius approximating the radius of the finished article and edging said blanks in their normal cylindrical shape to make joints when assembled.

15. The method of forming staves for tapered receptacles which consists in forming blanks, each having a cylindrical surface having a radius approximating the radius of the finished article and edging said blanks in their normal cylindrical shape to make joints when assembled and to give the same a width of which the circumference of the finished receptacle is a multiple.

16. The method of forming staves for tapered receptacles which consists in forming each blank with a cylindrical surface having a radius intermediate the radii of the large and small ends of the receptacle and edging said blanks to make joints when assembled and to give the same a width of which the circumference of the finished receptacle is a multiple.

17. The method of forming staves for tapered receptacles which consists in forming each blank with a cylindrical surface having a radius approximating the radius of the finished receptacle, cutting the croze in the blanks so formed and edging said blanks to make joints when assembled and to give the same a width of which the circumference of the finished receptacle is a multiple.

18. The method of forming staves for tapered receptacles which consists in forming each blank with a cylindrical surface having a radius approximating the radius of the finished article, cutting the croze and finishing the ends of the blanks so formed and edging said blanks to make joints when assembled and to give the same a width of which the circumference of the finished receptacle is a multiple.

In testimony whereof we have hereunto set our hands.

JAMES W. BROKAW.
MERTON L. DODGE.